(12) United States Patent
Stein et al.

(10) Patent No.: US 10,440,042 B1
(45) Date of Patent: Oct. 8, 2019

(54) DOMAIN FEATURE CLASSIFICATION AND AUTONOMOUS SYSTEM VULNERABILITY SCANNING

(71) Applicant: AREA 1 SECURITY, INC., Menlo Park, CA (US)

(72) Inventors: Peter Stein, Oak Park, IL (US); Connie Siu, Arlington, TX (US); Donghyun Michael Choi, Fremont, CA (US); Rahul Sridhar, San Jose, CA (US); Hunter van Adelsberg, Villanova, PA (US)

(73) Assignee: Area 1 Security, Inc., Menlo Park, CA (US)

( * ) Notice: Subject to any disclaimer, the term of this patent is extended or adjusted under 35 U.S.C. 154(b) by 137 days.

(21) Appl. No.: 15/158,253

(22) Filed: May 18, 2016

(51) Int. Cl.
*H04L 9/00* (2006.01)
*H04L 29/06* (2006.01)
*H04L 29/08* (2006.01)
*H04L 29/12* (2006.01)
*G06N 20/00* (2019.01)

(52) U.S. Cl.
CPC ......... *H04L 63/1433* (2013.01); *G06N 20/00* (2019.01); *H04L 61/1511* (2013.01); *H04L 67/02* (2013.01)

(58) Field of Classification Search
CPC .................. H04L 63/1433; H04L 61/1511
See application file for complete search history.

(56) References Cited

U.S. PATENT DOCUMENTS

| | | | |
|---|---|---|---|
| 7,519,954 B1 * | 4/2009 | Beddoe ............... | H04L 63/1433 709/224 |
| 8,078,625 B1 | 12/2011 | Zhang | |

(Continued)

OTHER PUBLICATIONS

Stein, U.S. Appl. No. 15/166,135, filed May 26, 2016, Notice of Allowance, dated Jul. 10, 2018.

*Primary Examiner* — Alexander Lagor
*Assistant Examiner* — Syed M Ahsan
(74) *Attorney, Agent, or Firm* — Hickman Palermo Becker Bingham LLP

(57) ABSTRACT

In an embodiment, a data processing method providing an improvement in computer security, comprises selecting, from a domain name queue comprising a plurality of domain names, a particular domain name to analyze; extracting one or more features of the particular domain name; determining a particular risk priority score of the particular domain name based on analyzing the one or more features of the particular domain name by applying a classifier to the one or more features of the particular domain name; inserting the particular risk priority score and an identifier associated with the particular domain name into a priority queue comprising a plurality of risk priority scores and a plurality of domain names; repeating the selecting, extracting, determining, and inserting steps for the remaining domain names in the domain name queue; retrieving from the priority queue, based upon the risk priority score, the identifier associated with the particular domain name; determining the particular domain name associated with the identifier; scanning the particular domain name for malicious content or security vulnerabilities; and outputting results of the scanning to a system, database, or report.

12 Claims, 8 Drawing Sheets

(56) References Cited

U.S. PATENT DOCUMENTS

| | | | |
|---|---|---|---|
| 8,943,588 B1 * | 1/2015 | Speegle | H04L 63/1483 |
| | | | 726/22 |
| 9,363,282 B1 * | 6/2016 | Yu | H04L 63/1425 |
| 2007/0073704 A1 | 3/2007 | Bowden | |
| 2014/0259158 A1 | 9/2014 | Brown | |
| 2015/0206169 A1 | 7/2015 | Ye | |
| 2015/0365305 A1 * | 12/2015 | Namata | G06Q 30/00 |
| | | | 705/14.54 |
| 2016/0232154 A1 * | 8/2016 | Hoskinson | H04L 61/3035 |
| 2017/0026391 A1 * | 1/2017 | Abu-Nimeh | H04L 63/1416 |
| 2018/0219907 A1 * | 8/2018 | Long | H04L 63/1433 |

* cited by examiner

| Operating System | Time to Live | TCP Window Size |
|---|---|---|
| Linux (Kernel 2.4 and 2.6) | 64 | 5840 |
| Google Linux | 64 | 5720 |
| Free BSD | 64 | 65535 |
| Windows XP | 128 | 65535 |
| Windows Vista and 7 (Server 2008) | 128 | 8192 |

DOMAIN FEATURE CLASSIFICATION AND AUTONOMOUS SYSTEM VULNERABILITY SCANNING

FIELD OF THE DISCLOSURE

The present disclosure generally relates to network security techniques, and relates more specifically to techniques for performing domain feature classification and/or vulnerability scanning for autonomous systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In computer networking and security, the efficient detection of domains that contain malicious content is a difficult problem. Likewise, the efficient detection of domains that possess vulnerabilities to malicious attacks is challenging.

Present techniques to address the foregoing problem domain generally have been found to be ineffective, slow, or incomplete, so that improved solutions are needed.

SUMMARY

The appended claims may serve as a summary of the invention.

BRIEF DESCRIPTION OF THE DRAWINGS

In the drawings:

FIG. 4 illustrates exemplary default values that may be used to perform operating system fingerprinting.

DETAILED DESCRIPTION

Figure 1:
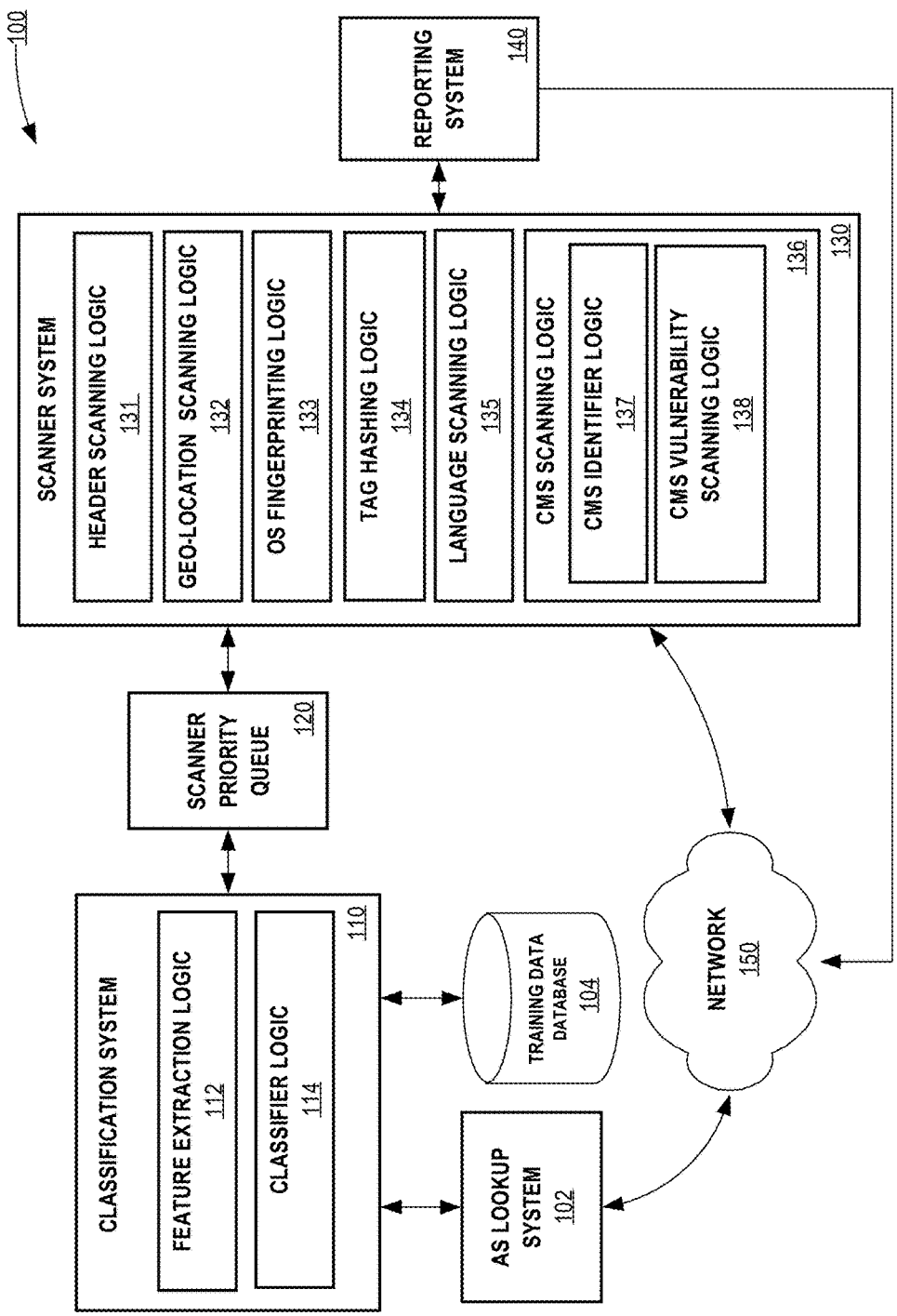
FIG. 1 illustrates a system architecture featuring a classification system, a scanner priority queue, and a scanner system.

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

Embodiments are described herein according to the following outline:

1.0 General Overview
2.0 Example System Architecture
　2.1 Classification System
　　2.1.1 AS Lookup System
　　2.1.2 Feature Extraction Logic
　　2.1.3 Classifier Logic
　2.2 Scanner System
　　2.2.1 Header Scanning Logic
　　2.2.2 Geo-Location Scanning Logic
　　2.2.3 OS Fingerprinting Logic
　　2.2.4 Tag Hashing Logic
　　2.2.5 Language Scanning Logic
　　2.2.6 CMS Scanning Logic
　2.3 Reporting System
3.0 Example Process
4.0 Implementation Mechanisms—Hardware Overview
5.0 Other Aspects of Disclosure

1.0 GENERAL OVERVIEW

An autonomous system (AS) is a collection of Internet Protocol (IP) addresses associated with one or more computers and under the control of a single administrative entity using a shared routing protocol. An administrative entity can be, for example, an enterprise or institution such as a university, a large company, a division of a company, a group of companies, a governmental body, or an internet service provider (ISP). An AS is assigned a unique autonomous system number (ASN). Many ASs preside over a large number of domains associated with their range of IP addresses. Scanning the domains associated with an AS can help to identify domains that contain malicious content and/or vulnerabilities to malicious attacks performed by third parties. Scanning such domains can also generate useful data regarding their content. However, scanning a domain requires many network requests and can be a slow process that requires significant computing resources, including processing power and memory. Given the large number of domains associated with an AS, scanning each individual domain can be slow and inefficient. The present disclosure provides improved techniques for classifying and scanning domains associated with an AS.

In an embodiment, a classification system is programmed to determine one or more domains associated with an AS. For a given domain associated with an AS, the classification system can extract one or more features from the domain. Using machine learning techniques, the classification system can apply a classifier to the extracted features in order to determine a risk priority score for the domain. The domain and its risk priority score can be placed into a scanner priority queue. A scanner system can then retrieve domains from the scanner priority queue, based upon the risk priority score, in order to prioritize scanning for domains that have a higher risk priority score. The scanner system may then scan a domain to collect data regarding the domain, including data related to whether the domain contains malicious content and/or vulnerabilities to malicious attacks performed by third parties. In an embodiment, the scan results may be sent to a reporting system that can store the scan results and/or generate reports or notifications regarding the scan results.

While each of the drawing figures illustrates a particular embodiment for purposes of illustrating a clear example, other embodiments may omit, add to, reorder, and/or modify any of the elements shown in the drawing figures.

2.0 EXAMPLE SYSTEM ARCHITECTURE

FIG. 1 illustrates the architecture of a computer system, according to one embodiment of the present invention. In the example of FIG. 1, system 100 may include a classification system 110, scanner priority queue 120, scanner system 130, and reporting system 140. Classification system 110 may include feature extraction logic 112 and classifier logic 114. Additionally, classification system 110 may be coupled to AS lookup system 102 and training data database 104. Furthermore, classification system 110 is coupled to scanner priority queue 120.

Scanner priority queue 120 is coupled to scanner system 130. Scanner system 130 may include one or more sets of scanning logic, including header scanning logic 131, geolocation scanning logic 132, OS fingerprinting logic 133; tag hashing logic 134, language scanning logic 135, and content management system (CMS) scanning logic 136. CMS scanning logic 136 may include CMS identifier logic 137 and/or CMS vulnerability scanning logic 138. Scanner priority queue 120 is coupled to reporting system 140.

AS lookup system 102, scanner system 130, and/or reporting system 140 may each be coupled to network 150. Network 150 comprises one or more local networks, wide area networks, and/or may comprise the public internet in whole or in part.

Each of these systems and logic may be implemented using one or more computer programs, other software elements, or a combination of software, firmware and hardware. In one embodiment, each of the functional elements shown in FIG. 1 is implemented using executables compiled or otherwise prepared based upon computer program source code organized in projects or packages of multiple files associated with different classes, and object implementations of the classes that implement functional methods. Any suitable program development environment or source language may be used including but not limited to JAVA, OBJECTIVE-C, C, C++, and the like, and flow diagrams and other illustrations are provided herein to communicate algorithms that can be used as a basis of coding operational programs. Further details regarding the features of system 100 will be described herein in other sections.

2.1 Classification System

System 100 includes a classification system 110. Classification system 110 is a system of one or more computer programs that are programmed and capable of assigning a risk priority score to a particular domain.

2.1.1 Autonomous System Lookup

Classification system 110 is coupled to AS lookup system 102. AS lookup system 12 is programmed for identifying domains associated with an AS. Classification system 110 may send a request to AS lookup system 102 for all domains associated with an identifier. The identifier may be an ASN, an IP address, a URL, or the name of an administrative entity. In response, the AS lookup system 102 determines one or more ASs associated with the identifier. The AS lookup system 102 is programmed to determine all domains associated with the one or more ASs and returns the results to classification system 110.

For example, in one embodiment, classification system 110 sends a request to AS lookup system 102 for all domains associated with a particular ASN. In response, AS lookup system 102 determines all domains associated with the AS identified by the particular ASN and provides the results to classification system 110. In another embodiment, classification system 110 sends a request to AS lookup system 102 that specifies an IP address. In response, AS lookup system 102 determines what particular AS is associated with the IP address, and then returns all domains associated with the particular AS. In another embodiment, classification system 110 sends a request to AS lookup system 102 that specifies the name of an administrative entity. In response, AS lookup system 102 determines what particular AS or set of ASs are associated with the administrative entity. In one embodiment, AS lookup system 102 will return all domains associated with the particular AS or set of ASs that are associated with the administrative entity. In another embodiment, AS lookup system 102 will prompt classification system 110 to select a particular AS from a set of ASs.

In one embodiment, AS lookup system may communicate with network 150 in order to respond to the request of the classification system 110.

2.1.2 Feature Extraction Logic

Classification system 110 may include feature extraction logic 112. Feature extraction logic 112 is programmed to extract one or more features from a given domain name for a selected domain that was retrieved by AS lookup system 102. A feature represents a characteristic of the domain name. The classifier logic 114 may use the extracted features to determine a risk priority score for the domain name. The extracted features may be stored by feature extraction logic 112.

There are many types of features that can be extracted from a domain name by feature extraction logic 112. For example, in one embodiment, feature extraction logic 112 is programmed to extract a feature from a domain name that is the domain name itself.

In one embodiment, feature extraction logic 112 extracts a domain name length feature from a domain name. Domain name length is a value that represents the number of characters in the domain name. For example, in one embodiment, the domain name length for "example.com" is 11 and the domain name length for "www.example.com" is 14.

In one embodiment, feature extraction logic 112 extracts a domain name depth feature from a domain name. Domain name depth is a value that represents the number of subdomain levels in a domain name. For example, in one embodiment, the domain name depth for "example.com" is 2, the domain name depth for "mail.example.com" is 3, and the domain name depth for "www.mail.example.com" is 4.

In one embodiment, feature extraction logic 112 extracts a domain structure feature from a domain name. Domain structure feature is feature that indicates the respective lengths of each level of a domain. For example, the domain "www.example.com" may have a domain structure feature of [3, 7, 3], as the levels of the domain "www", "example", and "com" have lengths of 3, 7 and 3, respectively. The domain structure feature may be represented as an array or another similar data structure.

In one embodiment, feature extraction logic 112 extracts a top-level domain (TLD) for a domain name. A TLD is the topmost level of the domain. For example, the TLD for domain name "www.example.com" is ".com".

In one embodiment, feature extraction logic 112 extracts a pay-level domain (PLD) for a domain name. A PLD is a subdomain of the domain name for which users usually pay for. For example, the PLD for "www.example.com" is "example.com".

In one embodiment, feature extraction logic 112 extracts a domain name hyphen count feature from a domain name. Domain name hyphen count is a value that represents the number of hyphen characters in a domain name. For example, in one embodiment, the domain name hyphen count for "example.com" is 0, and the domain name hyphen count for "mail-server.example.com" is 1.

In one embodiment, feature extraction logic 112 extracts a domain name digit count from a domain name. Domain name digit count is a value that represents the number of numerical digits in a domain name. For example, in one embodiment, the domain name digit count for "example.com" is 0, and the domain name digit count for "server1.example.com" is 1, and the domain name digit count for "server123.example.com" is 3.

In one embodiment, feature extraction logic 112 extracts a domain name number count from a domain name. Domain name number count is a value that represents the number of discrete numbers in the domain name. A discrete number is a discrete contiguous set of numerical digits. For example, the domain name number count of "www.123.example.com" is 1 and the domain number count of "www.123.456.example.com" is 2.

In one embodiment, feature extraction logic 112 extracts a feature from a domain name that represents whether the first character of a domain name is a numerical digit or not. In one embodiment, this feature may be represented by a binary value. For example, in one embodiment, the binary value of this feature for "example.com" is 0 and the binary value of this feature for "999.example.com" is 1.

In one embodiment, feature extraction logic 112 extracts a feature from a domain name that represents whether the domain name is encoded in Punycode. In one embodiment, this feature may be represented by a binary value. Punycode is a way to represent Unicode with the limited character subset of ASCII supported by the Domain Name System and Punycode may be used for internationalized domain names (IDNs). For example, the Unicode string "café.com" is not supported by the Domain Name System because the "é" character is not an ASCII character. The string "café.com" can be encoded in Punycode as "xn--caf-dma.com" which is supported by the Domain Name System. A feature representing whether the domain name is encoded in Punycode can be extracted from a domain name. In one embodiment, the binary value of this feature for "example.com" is 0, and the binary value of this feature for "xn--caf-dma.com" is 1.

In one embodiment, feature extraction logic 112 extracts one or more features from a domain name wherein each such feature is a binary value that represent whether the domain name contains a particular character. For example, one such feature may be a binary value of whether the domain name contains the "a" character. Another such feature may be a binary value of whether the domain name contains the "z" character. Another such feature may be a binary value of whether the domain name contains the "3" character. This set of features can include any of the ASCII characters supported by the Domain Name System.

In one embodiment, feature extraction logic 112 extracts a feature from a domain name that is a binary value that represents whether the domain contains non-ASCII characters.

In one embodiment, feature extraction logic 112 extracts a feature from a domain name that is a binary value that represents whether the domain is found on a list of highly-trafficked websites on the web. For example, in one embodiment, the binary value can indicate whether the domain appears in the Alexa list of top 500 websites.

In one embodiment, feature extraction logic 112 extracts an entropy feature of the domain name, which is a value that represents the amount of entropy in the characters of the domain name. The entropy feature may be calculated as a Shannon entropy, an absolute entropy, or a normalized entropy. Shannon entropy may be calculated using known techniques, and the formula for calculating Shannon entropy is as follows: $H(X)=-\Sigma_i P(x_i) \log(P(x_i))$. Each realization $x_i$ corresponds to a single character in a given string and probability $P(x)$ associated with a given character may be stated as the frequency of the character in the given string. An absolute entropy is a value represents the Shannon entropy measured against the character frequency in a language (e.g., English). In another embodiment, a normalized entropy is computed as a feature, wherein the normalized entropy is a value that represents the absolute entropy divided by the expected entropy for a string of the same length. The entropy feature of the domain name can be calculated for the entire domain name, or a subsection of the domain name (e.g., TLD, PLD, etc.).

In one embodiment, feature extraction logic 112 is programmed to extract a set of one or more features from a domain name by first parsing multiword domain names using a word segmentation algorithm. A word segmentation algorithm is an algorithm that identifies word segments in a string, such as a domain name. For example, a word segmentation algorithm can be used on the domain name "firstexample.com" to yield the words "first" and "example". In one embodiment, feature extraction logic 112 compares the results of the word segmentation algorithm against a previously-stored list of keywords. The previously-stored list of keywords may share a common characteristic. For example, in one embodiment, the previously-stored list of keywords may be a list of keywords that frequently occur in benign domain names. In another embodiment, the previously-stored list of words may be a list of words that frequently occur in malicious domain names.

Feature extraction logic 112 can extract one or more features that represent whether the results of the word segmentation algorithm match one or more of the keywords in the previously-stored list of keywords. In one embodiment, feature extraction logic 112 extracts a separate feature for the comparison between the results of the word segmentation algorithm and each individual entry in the previously-stored list of keywords. In another embodiment, extraction logic 112 extracts one feature that represents the comparison between the word segmentation results and the entirety of the previously-stored list of keywords. For example, the feature may be a number count of the number of matches to the previously-stored list of keywords, or a binary value that indicates that any of the results of the word segmentation algorithm match any of the previously-stored list of keywords.

In one embodiment, feature extraction logic 112 also is programmed to extract features related to IP addresses for a given domain name. First, feature extraction logic 112 resolves a domain name into one or more the IP addresses. Each of these IP addresses can be a feature. Additionally, feature extraction logic 112 can extract a feature that represents the number of IP addresses that the domain name resolves to. For each IP address associated with a domain name, feature extraction logic 112 can extract a feature for the domain name that represents the country of origin for that IP address. Likewise, for each IP address associated with a domain name, feature extraction logic 112 can extract a feature for the domain name that represents the region of origin for that IP address. Both the country of origin and region of origin can be determined by an IP address lookup.

In one embodiment, feature extraction logic 112 extracts features related to the octets that make up an IP address associated with the domain name. For each IP address associated with a domain name, feature extraction logic 112 can extract four features for the domain name that represents each of four octets of the IP address. For example, if a given domain name resolved to IP address "001.002.003.004", the values 001, 002, 003, and 004 may each be extracted as a feature of the domain name, representing the first octet, second octet, third, octet, and fourth octet of the IP address, respectively.

Some domain names are represented explicitly as an IP address. Feature extraction logic 112 can extract a feature that is a binary value that indicates whether the domain name is an explicit IP address or not. For example, this binary value for the domain name "www.example.com" would be 0, but the binary value for the domain name "001.002.003.004" would be 1.

In one embodiment, feature extraction logic 112 extracts one or more stem features from the domain name, where a stem feature represents an n-stem of the domain name. An n-stem is the first n characters of a string. The value of n in an n-stem may be any integer value greater than zero, although the optimal values for n are 2, 3, and/or 4. For example, for the domain "example.com", a 2-stem may be "ex", a 3-stem may be "exa", and a 4-stem may be "exam", which may each be used as a stem feature.

In one embodiment, feature extraction logic 112 extracts one or more stem score features from the domain name. A stem score feature is a feature that represents the frequency with which one or more particular n-stems of the domain name appears in a set of reference data. The value of n may be any integer value greater than zero, although the optimal values for n are 2, 3, and/or 4. For example, in one embodiment, feature extraction logic 112 determines a particular n-stem for the domain name. Feature extraction logic 112 compares the particular n-stem for the domain name against previously-stored n-stem frequency distribution data. N-stem frequency distribution data is reference data that contains information regarding the frequency with which n-stems occur in a set of reference domain names that were previously determined to be either benign, malicious, or vulnerable. In one embodiment, feature extraction logic 112 generates n-stem frequency distribution data based on reference domain names received from training data database 104. In one embodiment, the n-stem frequency distribution data is limited to a set of n-stems that occurred most frequently in the reference domain names. For example, n-stem frequency distribution data may be limited to the 400 most frequently occurring n-stems in the set of reference domain names, and all other n-stems are treated as if they have a frequency of zero.

In one embodiment, feature extraction logic 112 extracts one or n-gram score features of the domain name. An n-gram is a contiguous sequence of n characters from a string. For example, the domain name "example.com" may be converted into a 2-gram as follows: [ex, xa, am, mp, pl, le, e., .c, co, om]. Likewise, the domain name "example.com" may be converted into a 3-gram as follows: [exa, xam, amp, mpl, ple, le., e.c, .co, com]. Similarly, the domain name "example.com" may be converted into a 4-gram as follows: [exam, xamp, ampl, mple, ple., le.c, e.co, .com]. The value of n in an n-gram may be any integer value greater than zero, although the optimal values for n are 2, 3, and/or 4. The n-gram may be stored in an array or other similar data structure. Each element of the array for an n-gram may be referred to as an n-gram entry.

An n-gram score feature is a feature that represents the frequency with which one or more n-gram entries in an n-gram appears in a set of reference data. The reference data includes n-grams of domain names of a plurality of reference domain names. Feature extraction logic 112 can determine a particular n-gram for a string associated with the domain name. For example, in one embodiment, the string associated with the domain name may be the entire domain name, and in another embodiment, the string associated with the domain name may be the TLD of the domain name. Feature extraction logic 112 compares each n-gram entry in the particular n-gram against previously-stored n-gram frequency distribution data. N-gram frequency distribution data is reference data that contains information regarding the frequency with which n-gram entries occur in a set of reference domain names that have been previously identified as benign, malicious, or vulnerable. The frequency may be represented as a relative frequency that indicates how often n-gram entries appeared in domain names across the set of reference domain names. In one embodiment, feature extraction logic 112 generates n-gram frequency distribution data based on reference domain names received from training data database 104. In one embodiment, the n-gram frequency distribution data is limited to a set of n-gram-entries that occurred most frequently in the benign reference domain names. For example, n-gram frequency distribution data may be limited to the 400 most frequently occurring n-gram entries, and all other n-gram entries are treated as if they have a frequency of zero.

N-gram frequency distribution data may be stored for each value of n and/or for each string subpart of the domain name (e.g., TLD, PLD, etc.). By comparing the n-gram entry for the particular domain name against the previously-stored n-gram frequency distribution data, feature extraction logic 112 is able to determine an n-gram score feature that indicates the frequency with which the particular n-gram entry appears in the set of reference domain names. For example, a different n-gram score feature may be extracted for each n-gram entry in a 2-gram (e.g., [ex, xa, am, mp,]), by comparing each n-gram entry in the 2-gram against a set of previously-stored n-gram frequency distribution data. For example, the result of this operation could be the following array (or similar data structure) of n-gram score features: [2, 3, 3, 0, . . . ]. A higher n-gram score feature indicates that a particular n-gram entry occurs more frequently in the previously-stored n-gram frequency distribution data. In another embodiment, an n-gram score represents the cosine distance between the n-gram of the string subpart of the particular domain name and the n-gram of the string subparts of a set of reference domain names.

In one embodiment, an n-gram score feature may be extracted that represents the average of the individual n-gram score features for each entry in the n-gram. In one embodiment, an n-gram score feature may be extracted for each value of n. In one embodiment, an n-gram score feature is the cosine distance between the particular n-gram of the domain name, and the previously-stored n-gram frequency distribution data. In one embodiment, an average n-gram score feature may be extracted that represents the average of one or more n-gram score features, which, in some cases, may be an average of averages.

2.1.3 Classifier Logic

Once feature extraction logic 112 has extracted one or more features from a domain name, classifier logic 114 may determine a risk priority score for the domain name. Classifier logic 114 may be implemented as programs that execute one of various known types of classifiers, including a logistic regression classifier, a linear support vector machine classifier, a random forest classifier, a nearest neighbor classifier, a Bayesian classifier, a perceptron, or a neural network.

Classifier logic 114 must be initially trained on a set of training data before it can be applied to the extracted features. Classification system 110 may retrieve training data from training data database 104. Training data includes a set of domain names that have previously been assessed to have a risk priority score or risk priority score range. Training data must be sufficiently large and includes domain names that are malicious, domain names that are benign, domain names that have been determined to contain vulnerabilities, and/or domain names that have been determined to not contain vulnerabilities. Classification system 110 may use training data to train the classifier logic 114.

Figure 2:
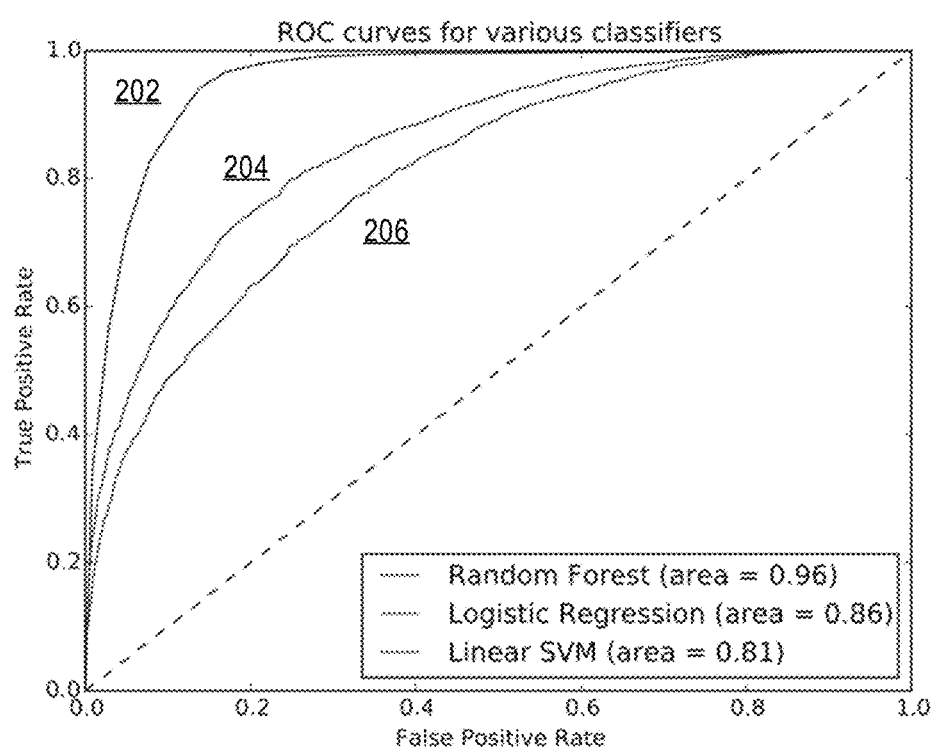
FIG. 2 illustrates an example of a receiver operating characteristic (ROC) curve.

During training, classification system 110 may tune the classifier logic 114 in order to improve the results given by the classifier logic 114. For example, classification system 110 may determine that a specific type of classifier (e.g., logistic regression classifier, linear support vector machine classifier, random forest classifier, etc.) may provide the most accurate results. For example, classification system 110 may prepare receiver operating characteristic (ROC) curves that plot the true positive rate of classifier logic 114 against the false positive rate of classifier logic 114 when classifier logic 114 is applied to training data. FIG. 2 illustrates exemplary ROC curves for a random forest classifier 202, logistic regression classifier 204, and linear support vector machine classifier 206. In general, the closer that the ROC curve follows the left-hand border and top border of the graph, the more accurate the test is. The area under the curve (AUC) of a ROC curve can be used to evaluate a classifier's accuracy. A larger AUC indicates that a particular ROC curve is more accurate. Thus, in FIG. 2, the random forest classifier 202 is the most accurate classifier and the linear support vector machine classifier 206 is the least accurate. Classification system 110 can analyze such ROC curves in order to tune classifier logic 114 to be implemented as the most accurate type of classifier.

Similarly, classification system 110 may determine various F-scores for applying the classifier logic 114 to different sets of features. An F-score is a measure of a test's accuracy and measures the precision (e.g., positive predictive value) and recall (e.g., sensitivity) of a test to compute a score. Classification system 110 may tune classifier logic 114 by analyzing various F-scores obtained when applying classifier logic 114 to training data, and determining a subset of one or more features to continue using that provides the most accurate test results.

Classifier logic 114 may perform data preprocessing on the one or more extracted features in order to ensure that the features are formatted in a way that is usable by the classifier logic 114 in its subsequent training and classification processes. First, classifier logic 114 encodes features that represent categorical data using a one-hot encoding algorithm. For example, a feature such as country of origin may be represented as categorical data such as "US", "UK", "GR", "FR", etc. which can then be converted to numerical data using one-hot encoding techniques. Next, classifier logic 114 normalizes the features to ensure that no one feature has a larger average numerical value that dominates the training process.

Once classifier logic 114 is trained, classifier logic 114 can be applied to the one or more features extracted for a particular domain name in order to analyze the one or more features of the particular domain name and determine a risk priority score of the particular domain name based on its analysis of the one or more features. Classifier logic 114 may add a unique identifier that identifies the domain name and the risk priority score for the domain name to a scanner priority queue 120 that is coupled to classification system 110. In one embodiment the unique identifier may be the domain name itself. Scanner priority queue 120 is a priority queue data structure that is similar to a regular queue data structure, however each element of the queue additionally has a priority associated with it, and an element with a higher priority is served before an element with lower priority. If two elements of a priority queue data structure have identical priority they are served according to their order in the queue. By storing the unique identifier that identifies the domain name and the risk priority score for the domain name in scanner priority queue 120, classification system 110 can prioritize which domain names should be scanned first, thereby improving the efficiency of scanner system 130.

Classification system 110 can repeat the feature extraction and classification for each domain name that was retrieved from the AS lookup system 102.

2.2 Scanner System

Scanner system 130 may be programmed to retrieve one or more domain names from the scanner priority queue 120. In one embodiment, scanner system 130 retrieves the identifier and risk priority score for the domain name that has the highest risk priority score in the scanner priority queue 120. In one embodiment, scanner system 130 retrieves a batch of identifiers and risk priority scores for the domain names that have the highest risk priority score in the scanner priority queue. For example, scanner system 130 may retrieve a batch of 50 identifiers for domain names that may be batch evaluated. Next, scanner system 130 determines the particular domain name(s) associated with the retrieved identifier(s).

For a particular domain name, scanner system 130 performs one or more scanning operations to scan the contents of the domain associated with the domain name. The purpose of the scanning operations is to collect and determine useful information regarding the domain related to malicious content that may exist in the domain and/or vulnerabilities to malicious attacks by third parties. Scanner system 130 is coupled to network 150 in order to perform various data requests of the domain, and other third party resources available via network 150.

2.2.1 Header Scanning Logic

In one embodiment, scanner system 130 may be programmed to scan a domain with header scanning logic 131. Header scanning logic 131 may send a HTTP request to one or more remote servers associated with the domain. In one embodiment, such HTTP requests are sent via cURL, which is a command line tool for performing HTTP requests. Scanning logic 131 can then analyze the HTTP response header sent by the remote server to determine characteristics of the remote server. For example, in one embodiment, scanning logic 131 determines the server engine type by analyzing the "Server" field of the HTTP response header. In another embodiment, scanning logic 131 determines the PHP version by analyzing the "X-Powered-By" field of the HTTP response header. Additional information can be gathered from other fields of the HTTP response header.

2.2.2 Geo-Location Scanning Logic

In one embodiment, scanner system 130 may be programmed to scan a domain with geo-location scanning logic 132. Geo-location scanning logic 132 can determine geographic information about the IP address(es) associated with a particular domain name, such as country of origin and region of origin. In one embodiment, geo-location scanning logic 132 may utilize MaxMind's GeoIP3 service to determine this information.

2.2.3 OS Fingerprinting Logic

Figure 3:
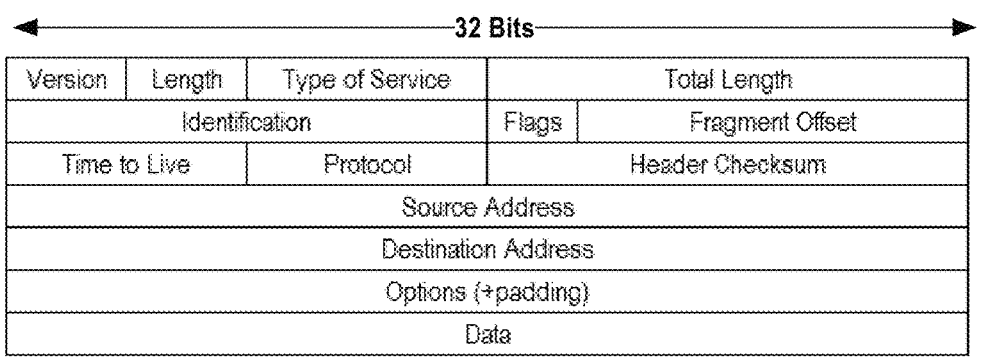
FIG. 3 illustrates the structure of an internet protocol packet and a transmission control protocol packet.
Figure 3:
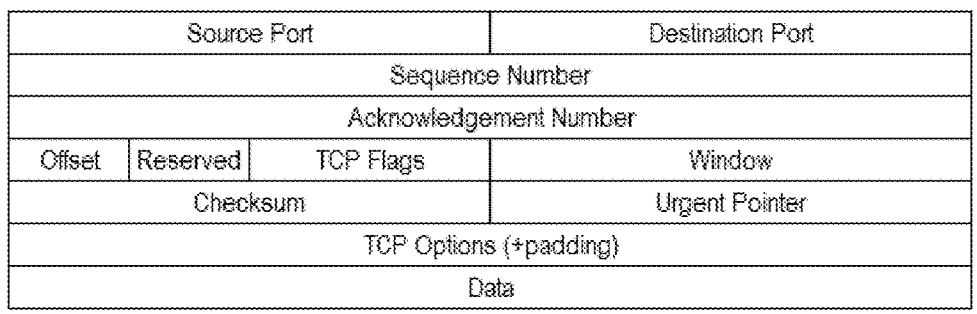

In one embodiment, scanner system 130 may be programmed to scan a domain with OS fingerprinting logic 133. OS fingerprinting logic 133 captures TCP/IP packets sent by the remote server associated with the domain and analyzes their fields of the packet to determine the operating system (OS) of the remote server of the domain. FIG. 3 illustrates the structure of an IP packet 302 and a TCP packet 300. Different operating systems assign unique default values to some of the fields of the TCP/IP packet, such as the Time to Live (TTL) field, Type of Service field, the TCP flags, and the TCP Window Size field. These default values may be referred to as an OS fingerprint, and can be used to determine an OS for a particular remote server. For example, FIG. 4 illustrates exemplary default values for the TTL field and TCP Window Size for certain OSs. OS fingerprinting logic 133 may store the data collected from the TCP/IP packets and information regarding the determined OS of the domain. OS fingerprinting logic 133 can compare the data collected from the TCP/IP packets against a set of previously-stored OS default value data to determine the OS of the remote server.

2.2.4 Tag Hashing Logic

Determining whether a particular domain is implemented using a particular Content Management System (CMS) can provide useful information regarding the domain. A CMS is an application that allows publishing, editing, modifying, organizing, deleting, and/or maintaining content for a domain. Examples of some common CMSs include, but are not limited to, WordPress, Drupal, Blogger, Adobe CQ, and Joomla. However, a domain that is implemented using a particular CMS may possess certain vulnerabilities to malicious attacks by third parties that have exploited flaws in the CMS. For example, a particular CMS might possess certain plug-in vulnerabilities. Alternatively, a particular CMS might possess certain non-plug-in vulnerabilities. In order to extract a domain's CMS and/or CMS plugins during the scan operation, it may be necessary to scan for specific webpages associated with the domain. However, at the time of scanning, it may not be possible to determine whether those specific webpages exist.

In some cases, the domain may provide an HTML 404 error to indicate that the particular webpage is not found, which would indicate that the specific webpage does not exist. However, in other cases, the domain may instead redirect to a valid page of HTML content when it receives a request for a specific webpage that does not exist. For example, in some cases, the domain will redirect to a parking page, which is a placeholder page posted by web hosting services to reserve a particular domain. The parking page may be hosted by a third party web hosting service. In other cases, the domain will redirect to a generic placeholder page that indicates that the domain could not find the page that was requested. The generic placeholder page may be hosted on the same host as other pages in the domain, and therefore, can be difficult to identify. Although parking pages and/or generic placeholder pages may generally have a similar structure, they sometimes have slight variations in the content that is displayed. For example, they may specify the particular domain in the content of the webpage (e.g., "The domain example.com cannot be found"). Because of these slight variations, it can be challenging to determine if a specific webpage is a parking page or generic placeholder page, or neither.

Figure 5:
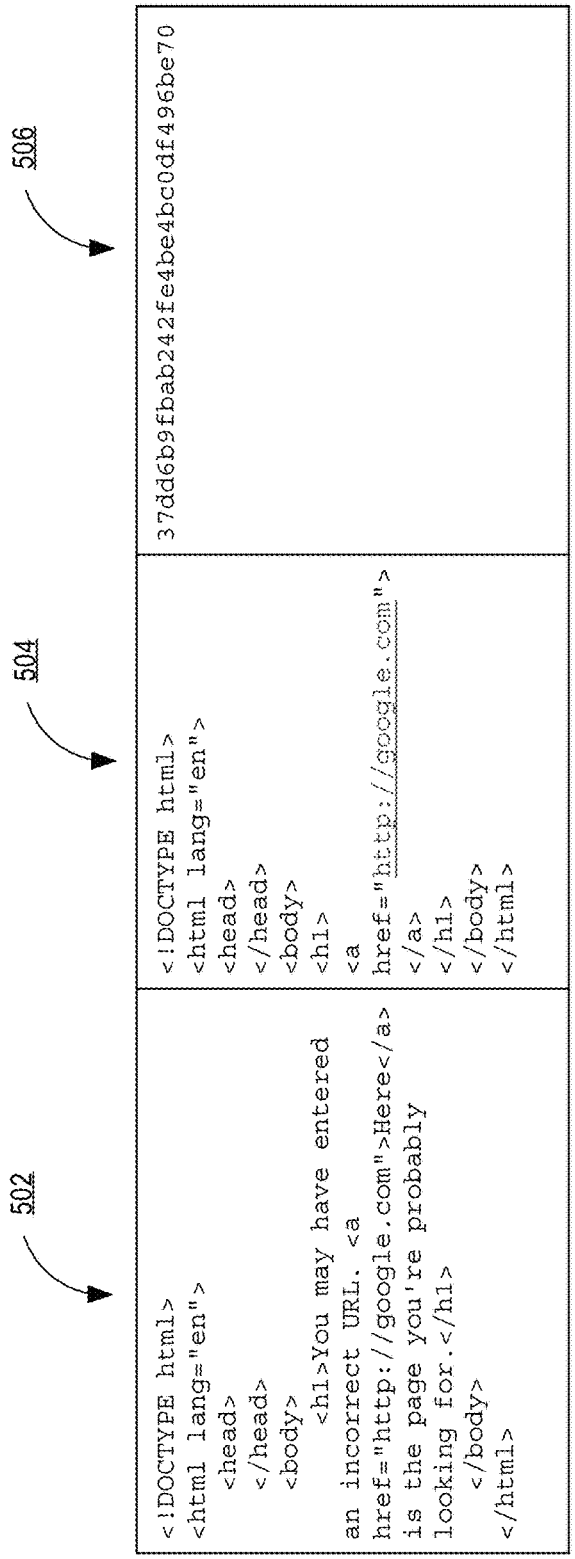
FIG. 5 illustrates an example of tag hashing of a hypertext markup language response.

In one embodiment, scanner system 130 may determine whether a specific webpage associated with a domain is a parking page or a generic placeholder page. For example, scanner system 130 may scan a domain with tag hashing logic 134. Tag hashing logic 134 performs a URL request for one or more specific webpages for a particular domain. FIG. 5 illustrates an example of HTML response 502 that may be received as a result of the request. Tag hashing logic 134 may then filter the HTML response 502 in order to remove all the content of the HTML response 502, such that only the HTML tags are remaining. The HTML tags 504 are an example of the result of filtering the HTML response 502. Tag hashing logic 134 may then perform a hash function on HTML tags 504. Tag hash 506 is an example of the result of performing a hash function on HTML tags 504. Tag hash 506 is therefore a hash of the tags of the HTML response without the content of the HTML response.

Accordingly, tag hash 506 may be the same for webpages that have the same HTML structure, but that have slight variations in content. Tag hashing logic 134 may then compare tag hash 506 against a pre-stored list of hashes in order to identify certain information regarding the requested webpage. For example, the pre-stored list of hashes may be a list generated by performing a similar tag hashing function on previously identified parking pages. Alternatively, the pre-stored list of hashes may be a list generated by performing a similar tag hashing function on previously identified generic placeholder pages. By comparing tag hash 506 to the pre-stored list of hashes, tag hashing logic 134 can determine whether the requested webpage is a parking page and/or whether the requested page is a generic placeholder page. The tag hash 506, and the result of the determination as to whether the specific webpage is a parking page and/or generic placeholder page may be stored for later analysis. In particular, these results may be helpful in determining whether the domain is implemented via a particular CMS and/or are using a particular CMS plugin.

2.2.5 Language Scanning Logic

In one embodiment, scanner system 130 may be programmed to determine what language (e.g., English) a specific webpage of a domain is written in with language scanning logic 135. Language scanning logic 135 may request one or more specific webpages associated with a domain. The result of the request may be an HTML response 502. A language scanning utility can be used to identify a language from a string. The python langdetect module is an example of a language detecting utility that can identify the language of the specific webpage, however, other such utilities may be used. Language scanning utilities can have difficulties accurately identifying the language of a string when the string contains HTML tags. Accordingly, language scanning logic 135 may strip the HTML response 502 of all of its HTML tags, so that all that is remaining is the content of the page without any HTML tags. For example, the result of stripping the HTML response 502 may be the string "You may have entered an incorrect URL. Here is the page you're probably looking for." Language scanning logic 135 may then use the language detecting utility on this string to determine the language(s) of the specific webpage. For example, the result of this operation for HTML response 502 may be some identifier that indicates that the response was written in English, or a probability that the language is English. In one embodiment, language scanning logic 135 may compare the language of the specific webpage with an expected language of the specific webpage.

2.2.1 CMS Scanning Logic

In one embodiment, scanner system 130 may be programmed to use CMS scanning logic 136 to determine CMS characteristics of one or more webpages in a domain. CMS characteristics may include, for example, an indication of what CMS the webpages are implemented, an indication of what plugin(s) the webpages use, an indication of the file structure of the website, and an indication of particular vulnerabilities that the webpages have based on the CMS that the webpages are implemented with. CMSs are widespread as they allows users to quickly and easily publish, edit, modify, organize, delete and/or maintain content for a domain.

In one embodiment, CMS scanning logic 136 may include CMS identifier logic 137 that may be programmed to scan a website on a domain to determine the CMS of the website. For example, CMS identifier logic 137 can determine the CMS of a particular website based on certain CMS website characteristics. CMS website characteristics may include the result of a tag hash performed by the tag hashing logic 134 on one or more specific webpages of the particular website. CMS website characteristics may include the structure, content, or default values in the HTML response provided by the particular website. CMS website characteristics may include the structure, content, or default values in the headers provided by the particular website. CMS website characteristics may include the file structure of the website. The CMS identifier logic 137 can compare one or more CMS website characteristics for the particular website against one or more pre-stored values of characteristics for websites that have previously had their CMS identified. The result of this comparison is a determination as to the particular CMS and/or CMS version of the website. In one embodiment, the result of the determination is a probability.

In one embodiment, CMS scanning logic 136 includes CMS vulnerability scanning logic 138 that may be programmed to scan and identify particular vulnerabilities of a website based on the CMS that it is using. Websites that are implemented with a particular CMS possess certain vulnerabilities. For example, websites that are implemented using the same CMS may use the same plugin(s). The presence of a particular plugin can create a vulnerability for a website, as an attacker can use a plugin to perform a malicious attack on the website. For example, some plugins allow an attacker to run its own source code on the website. The plugin vulnerabilities can exist based on specific plugins (e.g., JavaScript, PHP, etc.) that are used by the website. Typically, websites that are implemented with the same CMS use similar plugins and thus have the similar plugin vulnerabilities as one another. Attackers can use similar attacking techniques for multiple websites implemented on the same CMS, thus making such websites attractive targets.

Once the CMS for a particular website is identified for a website with CMS identifier logic 137, CMS vulnerability scanning logic 138 can scan for plugin vulnerabilities that are associated with the identified CMS. For example, if a particular website is implemented with a particular CMS, the domain may include a particular URL that directs to a particular page(s) with information about the plugin (e.g., READMEs, JavaScript, PHP source code and the like). CMS vulnerability scanning logic 138 can use previously stored information regarding the file structure associated with the particular CMS to identify the particular page(s) to determine whether one or more plugins are being used by the website. Based on this determination, CMS vulnerability scanning logic 138 can identify one or more CMS plug-in vulnerabilities.

Similarly, websites that have the same CMS may have certain non-plugin vulnerabilities. For example, CMS vulnerability scanning logic 138 can check for specific fault codes in XML-RPC responses to username/password attempts which could indicate a vulnerability to brute force password guessing. Similarly, websites that are implemented with the same CMS may have a similar file structure for the content of the website as one another. An attacker can take advantage of the similarities in file structure for websites implemented by the same CMS to perform a malicious attack on the website. CMS vulnerability scanning logic 138 can determine such vulnerabilities based on file structure for the CMS that was identified for the website. Additionally, CMS vulnerability scanning logic 138 can determine the base version of the CMS and compare the base version of the CMS against a pre-stored list of base versions of CMSs that have previously been identified to contain bugs that present vulnerabilities to malicious attacks. CMS vulnerability scanning logic 138 can determine such vulnerabilities based on the base version of the CMS.

2.3 Reporting System

Scanner system 130 is coupled to reporting system 140. For each domain name that is scanned, scanner system 130 can send the results of its scanning operations to reporting system 140. For example, for each of the scan operations performed by one or more of header scanning logic 131, geo-location scanning logic 132, OS fingerprinting logic 133, tag hashing logic 134, language scanning logic 135, and CMS scanning logic 136, data regarding the content and/or vulnerabilities of the scanned domain and websites associated with the domain can be sent to reporting system 140. Reporting system 140 can be implemented as its own system that is programmed for generating reports, or as a database that may be queried for information regarding the contents and vulnerabilities of the scanned domains and websites associated with the scanned domains. In one embodiment, reporting system 140 is a PostgresSQL database that would allow a user or another system to perform queries on the scanned data to retrieve meaningful information regarding the scanned domain names. In one embodiment, reporting system 140 may generate and send device notifications, instant messages, social media updates, emails, spreadsheets, API notifications, or other types of updates regarding domain names to third party user computers.

3.0 Example Process

Figure 6:
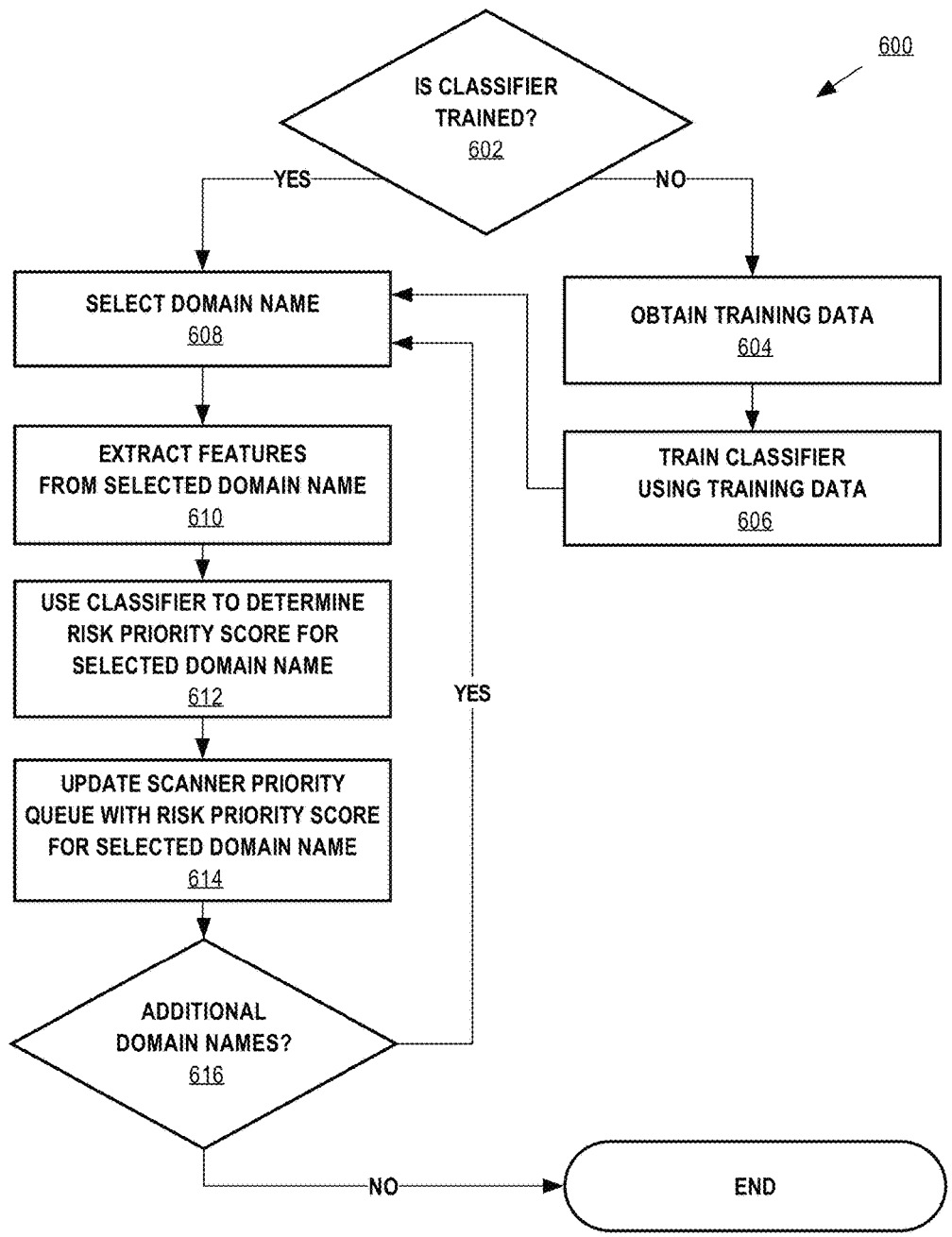
FIG. 6 illustrates a process for determining a risk priority score for a set of domains.
Figure 7:
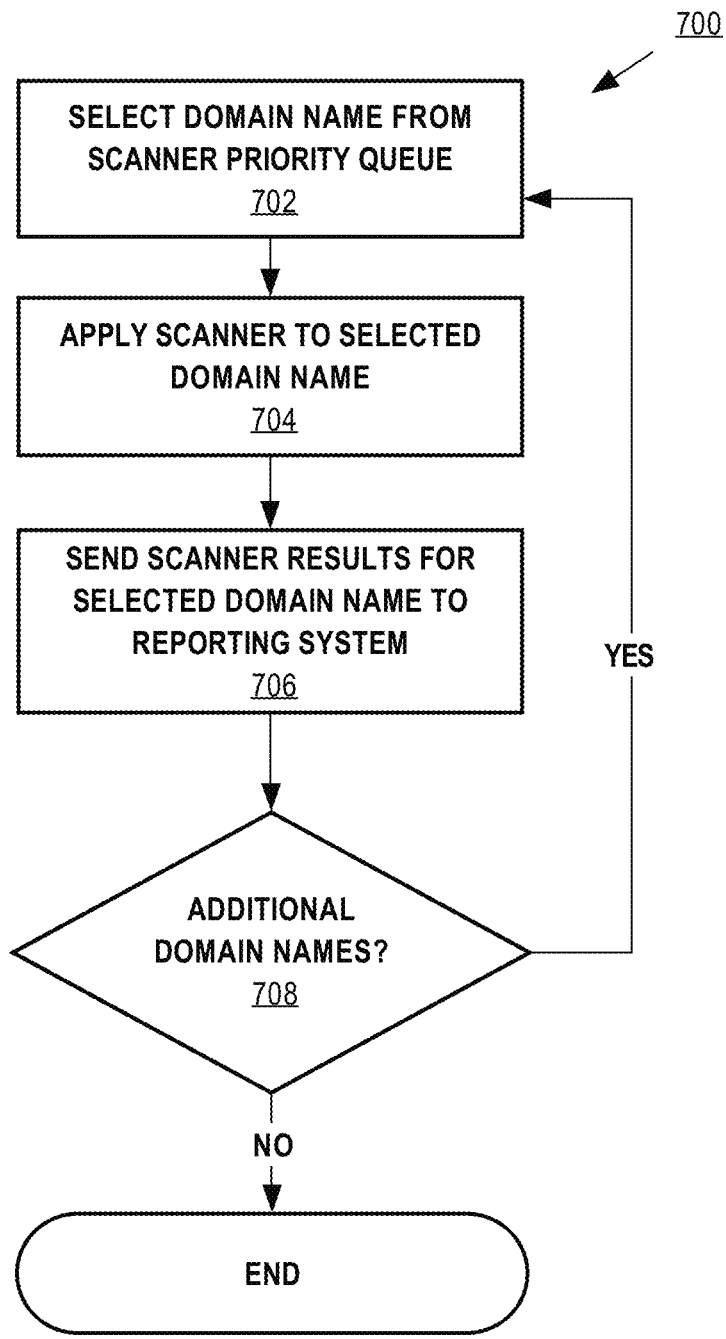
FIG. 7 illustrates a process for scanning domain names retrieved from a scanner priority queue.

FIG. 6 illustrates a process 600 of determining a risk priority score for a set of domains, such as the set of domains associated with an AS, as described above with reference to AS lookup system 102. FIG. 7 illustrates a process 700 of scanning domain names from a scanner priority queue. Process 600 and process 700 may be implemented using system 100 of FIG. 1. Thus, the flow diagrams of FIG. 6 and FIG. 7 will serve as a functional specification that a skilled person may use to write, debug, execute and otherwise program one or more computer programs, methods, and/or algorithms, using any suitable language or programming environment such as JAVA, C++, OBJECTIVE-C, C, PASCAL, or to design the gate structure, layout or programming of ASICS or FPGAs, or other logic, special-purpose computers or general-purpose computers loaded with stored programs.

Referring first to FIG. 6, in block 602, the process 600 determines whether classifier logic 114 is trained. If classifier logic 114 is not trained, then control passes to block 604. If classifier logic 114 is trained, then control passes to block 608.

At block 604, classification system 110 obtains training data. For example, classification system 110 may obtain training data from a database, such as training data database 104. The training data retrieved from training data database 104 is a sufficient number of domains on which to perform training. In one embodiment, the training data 104 includes domains that are benign and domains that are malicious. In one embodiment, the training data 104 includes domains that are vulnerable to malicious attacks and domains that are not vulnerable to malicious attacks. The process 600 then passes control to block 606.

At block 606, classification system 110 uses the training data 104 to train classifier logic 114. Classifier logic 114 may comprise any known classifier type, such as a logistic regression classifier, linear support vector machine classifier, or a random forests classifier. Once classifier logic 114 is sufficiently trained, the process 600 passes control to block 608.

At block 608, classification system 110 selects a domain name from a plurality of domain names. In one embodiment, the plurality of domain names comprises a plurality of domain names associated with an AS. The process 600 then passes control to block 610.

At block 610, feature extraction logic 112 extracts one or more features from the selected domain name that was selected in block 608. In one embodiment, the one or more features are stored. The process 600 then passes control to block 612.

At block 612, classifier logic 114 uses the classifier that was previously trained to determine a risk priority score for the selected domain name that was selected in block 608 by applying the classifier to the one or more features extracted in block 610. Classifier logic 114 determines a risk priority score for the selected domain that represents the risk that the selected contains malicious content and/or the risk that the selected domain is vulnerable to a malicious attack. In one embodiment, classifier logic 114 performs data preprocessing on the one or more features prior to determining a risk priority score for the selected domain name. The process 600 then passes control to block 614.

At block 614, classification system 110 updates scanner priority queue 120 with an identifier that identifies the domain name and a risk priority score associated with the domain name. The process 600 then passes control to block 616.

At block 616, classification system 110 determines whether there are additional domain names that require processing. If there are additional domain names that classification system 110 needs to determine a risk priority score for, the process 600 passes control to block 608 to select another domain name. If there are no additional domain names that classification system 110 needs to determine a risk priority score for, the process 600 may end.

Referring now first to FIG. 7, in block 702, scanner system 130 selects a domain name from scanner priority queue 120. In one embodiment, scanner system 130 will select the single domain name that has the highest risk priority score in scanner priority queue 120. In another embodiment, scanner system 130 will select a set number of domain names that have the highest risk priority score in scanner priority queue 120 in order to perform batch scanning across multiple domain names simultaneously. For example, scanner system 130 can select the ten domain names that have the highest risk priority score. In one embodiment, scanner system 130 selects an identifier associated with a domain name that has the highest risk priority score in scanner priority queue 120, and may determine the domain name associated with the selected identifier. The process 700 then passes control to block 704.

At block 704, scanner system 130 scans the selected domain name and collects scanner results data based on that scanning. Scanner system 130 may use one or more sets of scanning logic to perform the scanning, including, but not limited to, header scanning logic 131, geo-location scanning logic 132, OS fingerprinting logic 133, tag hashing logic 134, language scanning logic 135, and CMS scanning logic 136. The process 700 then passes control to block 706.

At block 706, scanner system 130 sends scanner results data to reporting system 140. In one embodiment, scanner system 130 may store scanner results data. The process 700 then passes control to block 708.

At block 708, scanner system 130 determines if there are additional domain names in scanner priority queue 120 that require scanning. If there are additional domain names in scanner priority queue 120 that require scanning, the process 700 passes control to block 702. If there are no additional domain names in scanner priority queue 120, then the process 700 may end.

The techniques described herein offer numerous benefits and significant improvements over prior approaches or ideas. For example, the system architecture and processes disclosed herein are capable of identifying domains that contain malicious content and/or vulnerabilities to malicious attacks. As one particular example, classification system 110 determines a risk priority score for each domain name associated with an AS. Scanner system 130 may then use the risk priority score, as stored in scanner priority queue 120, to prioritize scanning for domain names that have a higher risk. This provides improved efficiency for scanner system 130. Additionally, the results of the scanning performed by scanner system 130 are sent to reporting system 140. Reporting system 140 may generate various types of reports for users that are interested in the data collected by scanner system 130 (e.g., email notifications, excel spreadsheets, reports generated in a word processing document, etc.). Reporting system 140 may also be implemented as a database that can be queried for useful information about the domain names. Reporting system 140 may also be coupled to another system, for example via an application programming interface (API) to allow another system to programmatically retrieve the scanned results data. The system 100 ensures that reporting system 140 is updated with data regarding those domain names that have a high risk first, as those are the domain names that are prioritized in the scanner priority queue 120.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
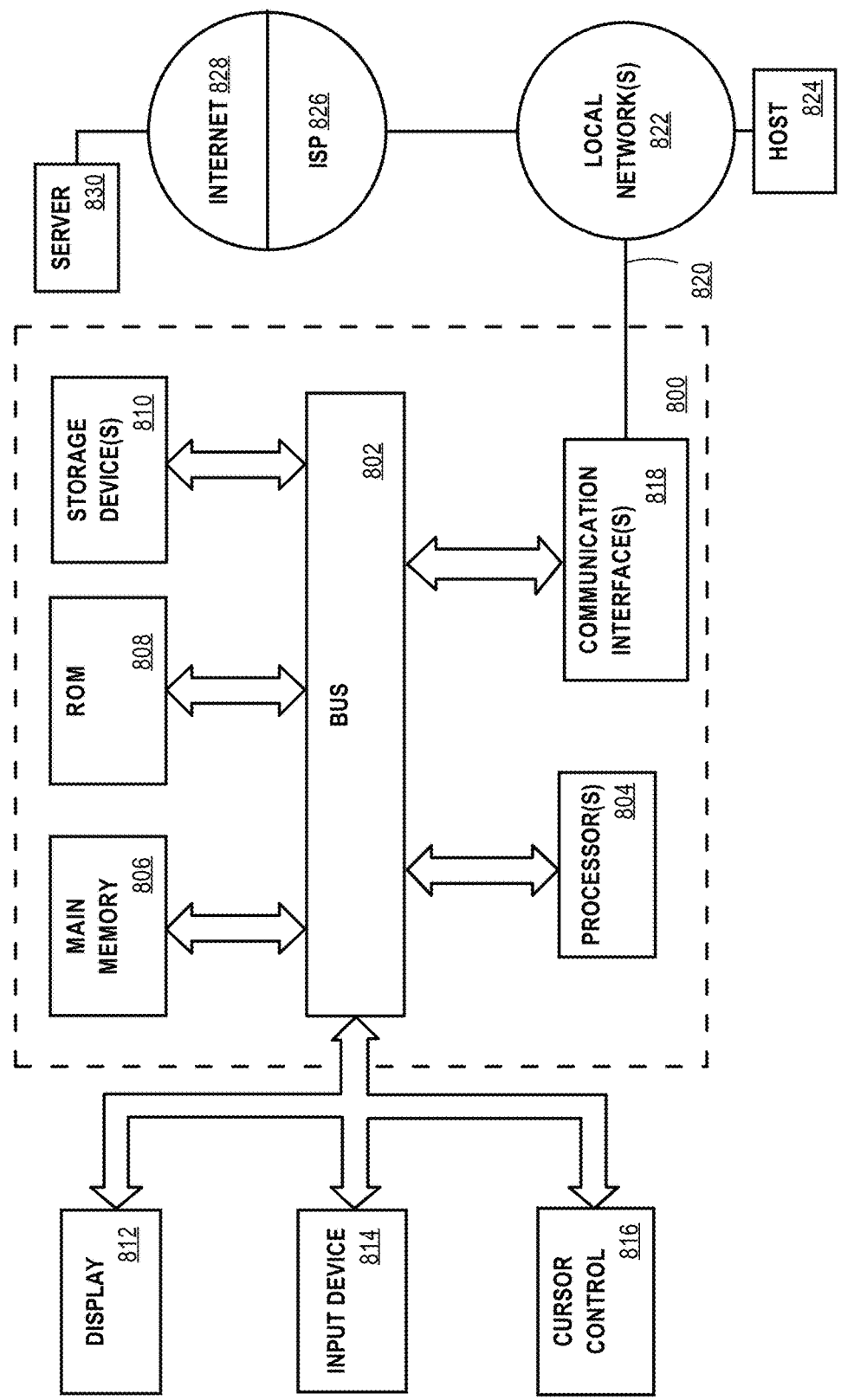
FIG. 8 illustrates a computer system upon which an embodiment of the invention may be implemented.

Referring now to FIG. 8, it is a block diagram that illustrates a special-purpose computing device 800 in which the example embodiment(s) of the present invention may be embodied. Computing device 800 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 800 may include a bus 802 or other communication mechanism for addressing main memory 806 and for transferring data between and among the various components of device 800.

Computing device 800 may also include one or more hardware processors 804 coupled with bus 802 for processing information. A hardware processor 804 may be a general purpose microprocessor, a system on a chip (SoC), or other processor.

Main memory 806, such as a random access memory (RAM) or other dynamic storage device, also may be coupled to bus 802 for storing information and software instructions to be executed by processor(s) 804. Main memory 806 also may be used for storing temporary variables or other intermediate information during execution of software instructions to be executed by processor(s) 804.

Software instructions, when stored in storage media accessible to processor(s) 804, render computing device 800 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, webpages, web applications, plugins, embedded software, microcode, compilers, debuggers, interpreters, virtual machines, linkers, and text editors.

Computing device 800 also may include read only memory (ROM) 808 or other static storage device coupled to bus 802 for storing static information and software instructions for processor(s) 804.

One or more mass storage devices 810 may be coupled to bus 802 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 810 (e.g., the main hard disk for the device) stores a body of program and data for directing operation of the computing device, including an operating system, user application programs, driver and other support files, as well as other data files of all sorts.

Computing device 800 may be coupled via bus 802 to display 812, such as a liquid crystal display (LCD) or other electronic visual display, for displaying information to a computer user. In some configurations, a touch sensitive surface incorporating touch detection technology (e.g., resistive, capacitive, etc.) may be overlaid on display 812 to form a touch sensitive display for communicating touch gesture (e.g., finger or stylus) input to processor(s) 804.

An input device 814, including alphanumeric and other keys, may be coupled to bus 802 for communicating information and command selections to processor 804. In addition to or instead of alphanumeric and other keys, input device 814 may include one or more physical buttons or switches such as, for example, a power (on/off) button, a "home" button, volume control buttons, or the like.

Another type of user input device may be a cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

While in some configurations, such as the configuration depicted in FIG. 8, one or more of display 812, input device 814, and cursor control 816 are external components (e.g., peripheral devices) of computing device 800, some or all of display 812, input device 814, and cursor control 816 are integrated as part of the form factor of computing device 800 in other configurations.

Functions of the disclosed systems, methods, and modules may be performed by computing device 800 in response to processor(s) 804 executing one or more programs of software instructions contained in main memory 806. Such software instructions may be read into main memory 806 from another storage medium, such as storage device(s) 810. Execution of the software instructions contained in main memory 806 cause processor(s) 804 to perform the functions of the example embodiment(s).

While functions and operations of the example embodiment(s) may be implemented entirely with software instructions, hard-wired or programmable circuitry of computing device 800 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more software instructions to processor(s) 804 for execution. For example, the software instructions may initially be carried on a magnetic disk or solid-state drive of a remote computer. The remote computer can load the software instructions into its dynamic memory and send the software instructions over a telephone line using a modem. A modem local to computing device 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor(s) 804 retrieves and executes the software instructions. The software instructions received by main memory 806 may optionally be stored on storage device(s) 810 either before or after execution by processor(s) 804.

Computing device 800 also may include one or more communication interface(s) 818 coupled to bus 802. A communication interface 818 provides a two-way data communication coupling to a wired or wireless network link 820 that is connected to a local network 822 (e.g., Ethernet network, Wireless Local Area Network, cellular phone network, Bluetooth wireless network, or the like). Communication interface 818 sends and receives electrical, electromagnetic, or optical signals that carry digital data streams representing various types of information. For example, communication interface 818 may be a wired network interface card, a wireless network interface card with an integrated radio antenna, or a modem (e.g., ISDN, DSL, or cable modem).

Network link(s) 820 typically provide data communication through one or more networks to other data devices. For example, a network link 820 may provide a connection through a local network 822 to a host computer 824 or to data equipment operated by an Internet Service Provider (ISP) 826. ISP 826 in turn provides data communication services through the world wide packet data communication network now commonly referred to as the "Internet" 828. Local network(s) 822 and Internet 828 use electrical, electromagnetic or optical signals that carry digital data streams. The signals through the various networks and the signals on network link(s) 820 and through communication interface(s) 818, which carry the digital data to and from computing device 800, are example forms of transmission media.

Computing device 800 can send messages and receive data, including program code, through the network(s), network link(s) 820 and communication interface(s) 818. In the Internet example, a server 830 might transmit a requested code for an application program through Internet 828, ISP 826, local network(s) 822 and communication interface(s) 818.

The received code may be executed by processor 804 as it is received, and/or stored in storage device 810, or other non-volatile storage for later execution.

5.0 OTHER ASPECTS OF DISCLOSURE

Using the systems and/or processing methods described herein, security may be increased, as the disclosed system prioritizes scanning domain names that have the highest risk or threat. By prioritizing scanning domain names this way, the system ensures that computer resources, including memory, processing power, and network bandwidth, are used for scanning the domain names that have the highest risk, threat or vulnerability. Additionally, the system ensures that data regarding the domain names that have the highest risk, threat, or vulnerability is sent to the reporting system with a higher priority.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method providing an improvement in computer security, comprising:

extracting one or more features of a particular domain name;

wherein the particular domain name is one of a plurality of domain names associated with a same autonomous system (AS);

determining a particular risk priority score of the particular domain name based on analyzing the one or more features of the particular domain name by applying a trained classifier to the one or more features of the particular domain name;

inserting the particular risk priority score and an identifier associated with the particular domain name into a priority queue;

repeating the extracting, determining, and inserting steps for the remaining domain names of the plurality of domain names associated with the same autonomous system (AS);

retrieving the identifier associated with the particular domain name from the priority queue for scanning the particular domain name for malicious content or security vulnerabilities before retrieving an identifier associated with a second domain name from the priority queue for scanning the second domain name for malicious content or security vulnerabilities, wherein the retrieving the identifier associated with the particular domain name from the priority queue before retrieving the identifier associated with the second domain name from the priority queue is based upon the particular risk priority score in the priority queue for the particular domain name and a risk priority score in the priority queue for the second domain name indicating a higher risk of malicious content or a higher risk of security vulnerability associated with the particular domain name than associated with the second domain name;

based upon the retrieving the identifier associated with the particular domain name from the priority queue before retrieving the identifier associated with the second domain name from the priority queue, scanning the particular domain name for malicious content or security vulnerabilities before scanning the second domain name for malicious content or security vulnerabilities;

outputting results of the scanning the particular domain name for malicious content or security vulnerabilities to a system, database, or report before outputting results of the scanning the second domain name for malicious content or security vulnerabilities to the system, database, or report; and wherein the scanning the particular domain name for malicious content or security vulnerabilities is based on performing at least one of:

(a) determining one or more characteristics of a remote host of the particular domain name by analyzing an HTTP header response sent by the remote host of the particular domain name, (b) determining geographic information about an internet protocol (IP) address associated with the particular domain name, (c) determining one or more characteristics of an operating system (OS) of a remote server of the particular domain name by comparing TCP/IP packets sent by the remote server to a set of previously-stored OS default value data, (d) determining whether a particular webpage associated with the particular domain name is a parking page or generic placeholder page by analyzing a tag hash of the particular webpage, (e) comparing a detected language of a set of content associated with the particular domain name with an expected language of the set of content associated with the particular domain name, (f) identifying a content management system (CMS) associated with the particular domain name by analyzing one or more CMS characteristics of the particular domain name, or (g) identifying one or more CMS vulnerabilities of the particular domain name.

2. The method of claim 1, wherein the classifier is a random forest classifier.

3. The method of claim 1, wherein the one or more features of the particular domain name comprises one or more of:
a value that represents a length of the particular domain name;
a value that represents a depth of the particular domain name;
a value that represents a number of hyphens in the particular domain name;
a value that represents a number of numerical digits in the particular domain name;
a binary value that represents whether the particular domain name starts with a numerical digit; and
a binary value that represents whether the particular domain name is encoded with Punycode.

4. The method of claim 1, wherein the one or more features of the particular domain name comprises one or more of:
a value that represents an entropy score for the particular domain name;
a value that represents an n-gram score based on a comparison of an n-gram of the particular domain name and a frequency distribution data for a reference set of domain names; and
a value that represents a number of IP address that the particular domain name resolves to.

5. The method of claim 1, wherein the one or more features of the particular domain name comprises one or more of:
a value that represents a country of origin of one or more IP addresses associated with the particular domain name; and a value that represents a region of origin of one or more IP addresses associated with the particular domain name.

6. The method of claim 1, wherein the one or more features of the particular domain name comprises one or more of:
a first octet of one or more IP addresses associated with the particular domain name;
a second octet of one or more IP addresses associated with the particular domain name;
a third octet of one or more IP addresses associated with the particular domain name; and
a fourth octet of one or more IP addresses associated with the particular domain name.

7. A data processing system providing an improvement in computer security, comprising:
a plurality of security scanning computers;
one or more non-transitory data storage media in the plurality of security scanning computers storing logic comprising one or more sequences of instructions configured to perform:
extracting one or more features of a particular domain name;
wherein the particular domain name is one of a plurality of domain names associated with a same autonomous system (AS);
determining a particular risk priority score of the particular domain name based on analyzing the one or more features of the particular domain name by applying a trained classifier to the one or more features of the particular domain name;
inserting the particular risk priority score and an identifier associated with the particular domain name into a priority queue;
repeating the extracting, determining, and inserting steps for the remaining domain names of the plurality of domain names associated with the same autonomous system (AS);
retrieving the identifier associated with the particular domain name from the priority queue for scanning the particular domain name for malicious content or security vulnerabilities before retrieving an identifier associated with a second domain name from the priority queue for scanning the second domain name for malicious content or security vulnerabilities, wherein the retrieving the identifier associated with the particular domain name from the priority queue before retrieving the identifier associated with the second domain name from the priority queue is based upon the particular risk priority score in the priority queue for the particular domain name and a risk priority score in the priority queue for the second domain name indicating a higher risk of malicious content or a higher risk of security vulnerability associated with the particular domain name than associated with the second domain name;
based upon the retrieving the identifier associated with the particular domain name from the priority queue before retrieving the identifier associated with the second domain name from the priority queue, scanning the particular domain name for malicious content or security vulnerabilities before scanning the second domain name for malicious content or security vulnerabilities;
outputting results of the scanning the particular domain name for malicious content or security vulnerabilities to a system, database, or report before outputting results of the scanning the second domain name for malicious content or security vulnerabilities to the system, database, or report; and wherein the one or more sequences of instructions are configured to perform the scanning the particular domain name for malicious content or security vulnerabilities based on the one or more sequences of instructions being configured to perform at least one of:

(a) determining one or more characteristics of a remote host of the particular domain name by analyzing an HTTP header response sent by the remote host of the particular domain name, (b) determining geographic information about an internet protocol (IP) address associated with the particular domain name, (c) determining one or more characteristics of an operating system (OS) of a remote server of the particular domain name by comparing TCP/IP packets sent by the remote server to a set of previously-stored OS default value data, (d) determining whether a particular webpage associated with the particular domain name is a parking page or generic placeholder page by analyzing a tag hash of the particular webpage, (e) comparing a detected language of a set of content associated with the particular domain name with an expected language of the set of content associated with the particular domain name, (f) identifying a content management system (CMS) associated with the particular domain name by analyzing one or more CMS characteristics of the particular domain name, or (g) identifying one or more CMS vulnerabilities of the particular domain name.

8. The data processing system of claim 7, wherein the classifier is a random forest classifier.

9. The data processing system of claim 7, wherein the one or more features of the particular domain name comprises one or more of:
a value that represents a length of the particular domain name;
a value that represents a depth of the particular domain name;
a value that represents a number of hyphens in the particular domain name;
a value that represents a number of numerical digits in the particular domain name;
a binary value that represents whether the particular domain name starts with a numerical digit; and
a binary value that represents whether the particular domain name is encoded with Punycode.

10. The data processing system of claim 7, wherein the one or more features of the particular domain name comprises one or more of:
a value that represents an entropy score for the particular domain name;
a value that represents an n-gram score based on a comparison of an n-gram of the particular domain name and a frequency distribution data for a reference set of domain names; and
a value that represents a number of IP address that the particular domain name resolves to.

11. The data processing system of claim 7, wherein the one or more features of the particular domain name comprises one or more of:
a value that represents a country of origin of one or more IP addresses associated with the particular domain name; and
a value that represents a region of origin of one or more IP addresses associated with the particular domain name.

12. The data processing system of claim 7, wherein the one or more features of the particular domain name comprises one or more of:
a first octet of one or more IP addresses associated with the particular domain name;
a second octet of one or more IP addresses associated with the particular domain name;
a third octet of one or more IP addresses associated with the particular domain name; and
a fourth octet of one or more IP addresses associated with the particular domain name.

* * * * *